United States Patent
Carpenter

(10) Patent No.: US 9,644,785 B2
(45) Date of Patent: May 9, 2017

(54) KEYBOARD STAND

(71) Applicant: U.S. Band & Orchestra Supplies, Inc., Ferguson, MO (US)

(72) Inventor: William M. Carpenter, Springboro, OH (US)

(73) Assignee: U.S. Band & Orchestra Supplies, Inc., Ferguson, MO (US)

( * ) Notice: Subject to any disclaimer, the term of this patent is extended or adjusted under 35 U.S.C. 154(b) by 0 days.

(21) Appl. No.: 14/645,493

(22) Filed: Mar. 12, 2015

(65) Prior Publication Data

US 2015/0267859 A1    Sep. 24, 2015

Related U.S. Application Data

(60) Provisional application No. 61/968,420, filed on Mar. 21, 2014.

(51) Int. Cl.
*G10G 5/00* (2006.01)
*F16M 11/24* (2006.01)
(Continued)

(52) U.S. Cl.
CPC .......... *F16M 11/24* (2013.01); *F16M 11/242* (2013.01); *F16M 11/247* (2013.01);
(Continued)

(58) Field of Classification Search
CPC .......... F16M 11/32; F16M 11/38; G10G 5/00; G10G 5/005; G10D 13/026; G10C 3/00
USPC .... 248/164, 166, 122.1, 434, 169, 170, 171, 248/439, 173, 440.1, 150, 165, 420, 423, 248/97, 149, 370, 161, 157, 188.7, 188.8, 248/188, 188.4, 188.5, 688, 421, 167,
(Continued)

(56) References Cited

U.S. PATENT DOCUMENTS

| 209,749 | A | * | 11/1878 | Brown | ............... | B65B 67/12 |
| | | | | | | 248/125.2 |
| 633,530 | A | * | 9/1899 | Myers | ............... | B65D 37/00 |
| | | | | | | 220/9.3 |

(Continued)

OTHER PUBLICATIONS

Yamaha Corporation of America and Yamaha Corporation, Adjustable X-Style Keyboard Stand PKBS1, Product Information Brochure, 2014, 2 pgs.
(Continued)

*Primary Examiner* — Nkeisha Smith
(74) *Attorney, Agent, or Firm* — Brian B. Diekhoff; Polsinelli PC

(57) ABSTRACT

A stand for a musical keyboard is both stable in a deployed configuration and conveniently compact and portable in a collapsed configuration. The separation of the arms and legs may not change in width as the height of the stand is adjusted. The stand has two "floating" V's, one for the arms and one for the legs. These components slide vertically in slots in a central column and are locked in place with clamps that wrap around the column. To adjust the height of the stand, a user loosens either or both the top and/or bottom clamp (arm clamp or leg clamp) and slides the associated floating V up or down along the center column, then re-tightening the clamp when adjustments are finished. For transport and storage, the user loosens each clamp and rotates the arms or legs in, towards the column.

21 Claims, 12 Drawing Sheets

(51) Int. Cl.
*F16M 11/32* (2006.01)
*F16M 11/38* (2006.01)
*G10H 1/32* (2006.01)

(52) U.S. Cl.
CPC ............ *F16M 11/32* (2013.01); *F16M 11/38* (2013.01); *G10G 5/00* (2013.01); *G10H 1/32* (2013.01)

(58) Field of Classification Search
USPC .... 248/435, 168, 172; 84/32, 327, 329, 421, 84/423, 425; 211/85.6, 13.1, 71.01, 189, 211/DIG. 1
See application file for complete search history.

(56) References Cited

U.S. PATENT DOCUMENTS

| | | | | |
|---|---|---|---|---|
| 666,045 | A * | 1/1901 | Beeson | B65F 1/1415 211/12 |
| 688,238 | A * | 12/1901 | Davis | B65B 67/12 248/100 |
| 775,962 | A * | 11/1904 | Beckman | B65B 67/12 248/100 |
| 791,379 | A * | 5/1905 | Terry | B65B 67/12 248/100 |
| 841,621 | A * | 1/1907 | Campbell | B65B 67/12 248/97 |
| 894,295 | A * | 7/1908 | Stoops | E04G 3/26 182/62 |
| 922,624 | A * | 5/1909 | Pederson | B65B 67/12 248/100 |
| 1,350,443 | A * | 8/1920 | Edstrom | B65B 67/1255 211/12 |
| 1,405,846 | A * | 2/1922 | Iverson | B65B 67/1255 248/97 |
| 1,446,346 | A * | 2/1923 | Hanson | B65B 67/1222 248/97 |
| 1,920,019 | A * | 7/1933 | Overmyer | B65B 67/1255 248/97 |
| 1,923,816 | A * | 8/1933 | Firl | B65B 67/12 248/100 |
| 2,158,546 | A * | 5/1939 | Lang | A61G 21/00 16/19 |
| 2,368,155 | A * | 1/1945 | Nash | A47B 27/02 108/148 |
| 3,181,828 | A * | 5/1965 | Cramer | A47C 9/025 248/125.3 |
| 4,691,610 | A * | 9/1987 | Gilbert | F16M 11/22 248/168 |
| 4,738,487 | A * | 4/1988 | Shalinsky | A47C 9/025 248/129 |
| 4,763,865 | A | 8/1988 | Danner | |
| 4,770,380 | A * | 9/1988 | Eason | F16M 11/00 248/165 |
| 4,793,654 | A * | 12/1988 | Takafuji | A47C 3/20 297/23 |
| 4,865,283 | A * | 9/1989 | Parker | A47F 5/04 108/191 |
| 5,297,771 | A * | 3/1994 | Gilbert | G10D 3/003 248/443 |
| 5,312,076 | A * | 5/1994 | Rogov | A47B 13/02 211/189 |
| 5,467,953 | A | 11/1995 | Malizia | |
| 5,702,158 | A * | 12/1997 | Mengshoel | A47B 57/26 108/106 |
| 5,839,991 | A * | 11/1998 | Hall | A63B 23/00 482/138 |
| 6,563,035 | B2 | 5/2003 | Hsieh | |
| 6,601,805 | B1 * | 8/2003 | Kapp | A47B 97/08 248/171 |
| 6,705,239 | B2 * | 3/2004 | Doyle | A47B 9/04 108/147 |
| 7,208,666 | B2 * | 4/2007 | Burch | G10G 7/005 248/243 |
| 7,243,896 | B2 * | 7/2007 | Zhang | B25H 1/04 248/164 |
| 7,368,647 | B2 * | 5/2008 | Hsieh | F16M 11/00 248/164 |
| 7,658,359 | B2 * | 2/2010 | Jones | A47B 9/00 108/147 |
| 7,932,451 | B2 | 4/2011 | Workman et al. | |
| D643,648 | S | 8/2011 | Eason | |
| 8,367,919 | B2 * | 2/2013 | Belitz | G10G 5/00 84/453 |
| 8,464,988 | B1 * | 6/2013 | Walker | F16M 11/38 108/50.01 |
| 9,046,117 | B2 * | 6/2015 | Belitz | G10G 5/00 |
| 2006/0185495 | A1 | 8/2006 | Hsieh | |
| 2008/0308687 | A1 * | 12/2008 | Terry | A47B 96/00 248/122.1 |

OTHER PUBLICATIONS

Yamaha Corporation of America and Yamaha Corporation, Z style Keyboard Stand PKBZ1, Product Information Brochure, 2014, 1 pg.
The Music People Inc., On-Stage Stands, KS7150 Platform Style Keyboard Stand, Product Information Brochure, Undated, 1 pg.

* cited by examiner

KEYBOARD STAND

This claims the benefit of U.S. Provisional Patent Application Ser. No. 61/968,420, filed Mar. 21, 2014 and hereby incorporated by reference in its entirety.

BACKGROUND OF THE INVENTION

This invention relates to a stand for supporting electronic piano type keyboard boxes, commonly referred to as keyboards, and cased equipment used by disc jockeys or DJ's (commonly referred to as DJ coffins) in different vertical positions in a horizontal orientation to facilitate a variety of users operating the keyboard from either a standing or sitting position.

The desire to support items has been known in some industries for many years. In a basic form, the concept may involve a readily deployable and collapsible support stand that is able to accommodate and support anticipated loads. In general, an electronic instrument type of keyboard and DJ coffins comprise a relatively long, narrow and low box-like configuration. The keyboards and coffins are portable and generally are moved about from place to place for use at different places or for storage. Thus, a suitable, lightweight, portable and foldable stand is needed to support the keyboard and coffin when desired. Different stand constructions have been made available in the past, but generally, these are relatively expensive, complicated or cumbersome in construction.

In the musical instrument support stand industry, particular attention has been paid to the development of apparatus that are collapsible into a storage or transport configuration and later deployable into an operational configuration, perhaps compatible with a variety of differently sized items (e.g., a variety of differently sized keyboards) and different user requirements. The collapsibility feature has evolved, at least in part, from the need for musicians to set up and stage their instruments, perhaps at a different venue each evening. Because compatibility may be a desired feature of some stands, the music industry has developed several stands that have adjustable support structures.

Particularly where a supported item (e.g., a keyboard) is used while it is supported by the stand, adjustability of a stand may be a desired feature (e.g., to accommodate different users' heights). Additionally, it may even be that a keyboard player, musician, performer or DJ who plans to aggressively play a high pitched percussive piece would want a broader support base than a similarly sized player playing a less aggressive piece substantially at the center of the keyboard, DJ coffin or other equipment. These and other factors relative to musicians and the instruments they play make an ability to change certain features of a deployed stand to accommodate different users, styles and instruments a desired stand feature.

One type of prior keyboard support stand has been formed of two H-shaped units, with elongated center bars pivotally connected together and arranged in an upright position. Thus, the legs of the H-shaped stand, being horizontally arranged, act as upper supports upon which a keyboard may be rested, and lower feet engage the ground. This type of support stand may be folded to place the two upright legs closely adjacent, or alternatively the legs may be spread apart at different angles for providing the desired height location of the keyboard. Straps, which interconnect the upper supports and the lower feet, have been used to set the distances between the respective supports or feet and, consequently, the resulting height of the supported keyboard.

Another type of known musical keyboard stand is often referred to as an X-type stand. This stand may be the simplest and least expensive design, and the most popular of all keyboard stands. The design is simple and includes two symmetrical cross members pivotally joined in the center. The height of the stand is adjusted by changing the angle of the cross members, thereby raising or lowering the keyboard mounting height.

The most common method of locking the height of this type of stand is by a pin being inserted into a plate with holes at the pivot. Other methods include a "saw-tooth" bar extending from one cross member to another and an enclosed ratchet housed about the center pivot.

One drawback of X-type stands is that the stability of the stand is compromised as the height of the keyboard or DJ coffin is raised since the lateral distance between the opposing arms and legs decreases as the height increases. A secondary defect is that at lower positions the width of the arms is too great to be used with smaller keyboards or coffins.

Another known type of musical keyboard stand is a Z-type. Even though this type of stand is portable, Z-type stands are much less portable than X-type stands. This design includes two Z-shaped end frames connected by horizontal crossbars for lateral stability. Z-type stands have the advantage of independent width and height adjustment. The disadvantage of this type of stand is its size, especially when folded for storage. Even when it is collapsed, this type of stand is not very compact. An additional drawback of the design is difficulty in folding. There are several knobs to be loosened to achieve the smallest size for transport and the frames have to be removed from the cross members. The required effort and time to collapse this type of stand is significant.

Another type of known stand is a T-type. These stands are like a folding table; four legs, locking leg-supports and a flat, table-like top. Width and height are independently adjustable. While these stands fold to a relatively flat form for transport, they, like the Z-type, take a significant amount of effort to get them as small as possible.

C-type stands are the most expensive of all the common stand types. Their design is based on an extruded aluminum column with blind slots for holding the support arms and legs. The arms are pivoted and locked in place with either player-facing or side-facing clamps. The advantages are infinite height adjustment along the column that is independent of the support arm width and a distinctive, identifiable look. Disadvantages are that the stand is no more stable than an X-type stand, and often less stable. The column limits horizontal adjustment of the keyboard and is bulky to transport, being typically 48 inches long. Some models do not have storage for the arms and legs within the column, while some do.

Therefore, a need exists for a musical equipment stand that does not suffer from these identified problems while still providing for a stable support for a variety of different configurations while still being easily and efficiently collapsible to a compact configuration

SUMMARY OF THE INVENTION

In various embodiments, a stand according to this invention is portable and stable while providing the advantage of the spacing between the arms and between the legs do not change in width as the height of the stand is adjusted.

In various embodiments, a stand of this invention has two "floating" V's, one for the arms and one for the legs. These components slide vertically in slots in an extruded aluminum column and are locked in place with clamps that wrap around the column. To adjust the height of the stand, a user loosens either the top or bottom clamp (arm clamp or leg clamp) and slides the associated floating V up or down along the center column, then re-tightening the clamp when adjustments are finished.

For transport and storage, the user loosens each clamp and rotates the arms or legs in, towards the column. If desired, the height location of each clamp can remain in the operational location so that the user can easily return to the previous stand height. When folded in its smallest position, the stand is very compact.

The clamps interleave into each other on the sides to provide compliance for dimensional difference and to allow for tightening of the clamps. This feature also provides for "locking" the front and back parts of the clamp so they do not bind when the arms and legs are moved along the column.

The clamps may also have guide pins on their internal face. The guide pins engage the slots in the column and provide guidance for the clamps, thereby reducing the likelihood of the clamps locking when the arms and legs are being slid along the column.

The backside (player facing side) of the bottom clamp has a lip or hand-grip. When adjusting the height location of the legs, a user may loosen the clamp knobs, holding the clamp by the hand-grip and move the column rather than holding the column and moving the leg assembly.

The column may be a modified I-beam with the arms and legs located between the flanges of the I-beam. The flanges of the column are flexible to allow for dimensional differences and clamping force. The expanded center section of the I-beam provides torsional stability and a force-carrying surface.

The arms and legs may have angled end pieces that bear against the center section of the column when in use. The arms and legs pivotally move within the flange of the column about a bolt that passes from one side of the clamp, through a slot in the column, through the arm/leg tubing, through the end pieces, through the slot in the opposing column flange and through the opposite clamp member. The bolt is held in place by a tension knob.

In use, part of the downward force of the keyboard and the player's actions are carried as a side load through the bolts which exert force against the outer edge of the slots while the angled end pieces carry part of the force into the expanded center of the column.

The tension knob is used to secure the arms and/or legs in location between the clamps and column flanges. When the tension knob is loosened, the arms and/or legs can be slideably adjusted up or down to adjust height or rotated in or out for storage or performance positioning. Advantageously, the width between the arms and/or between the legs does not change during height adjustment so that a variety of keyboard sizes (lengths) can be securely supported on the stand over a range of heights.

BRIEF DESCRIPTION OF THE DRAWINGS

The features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
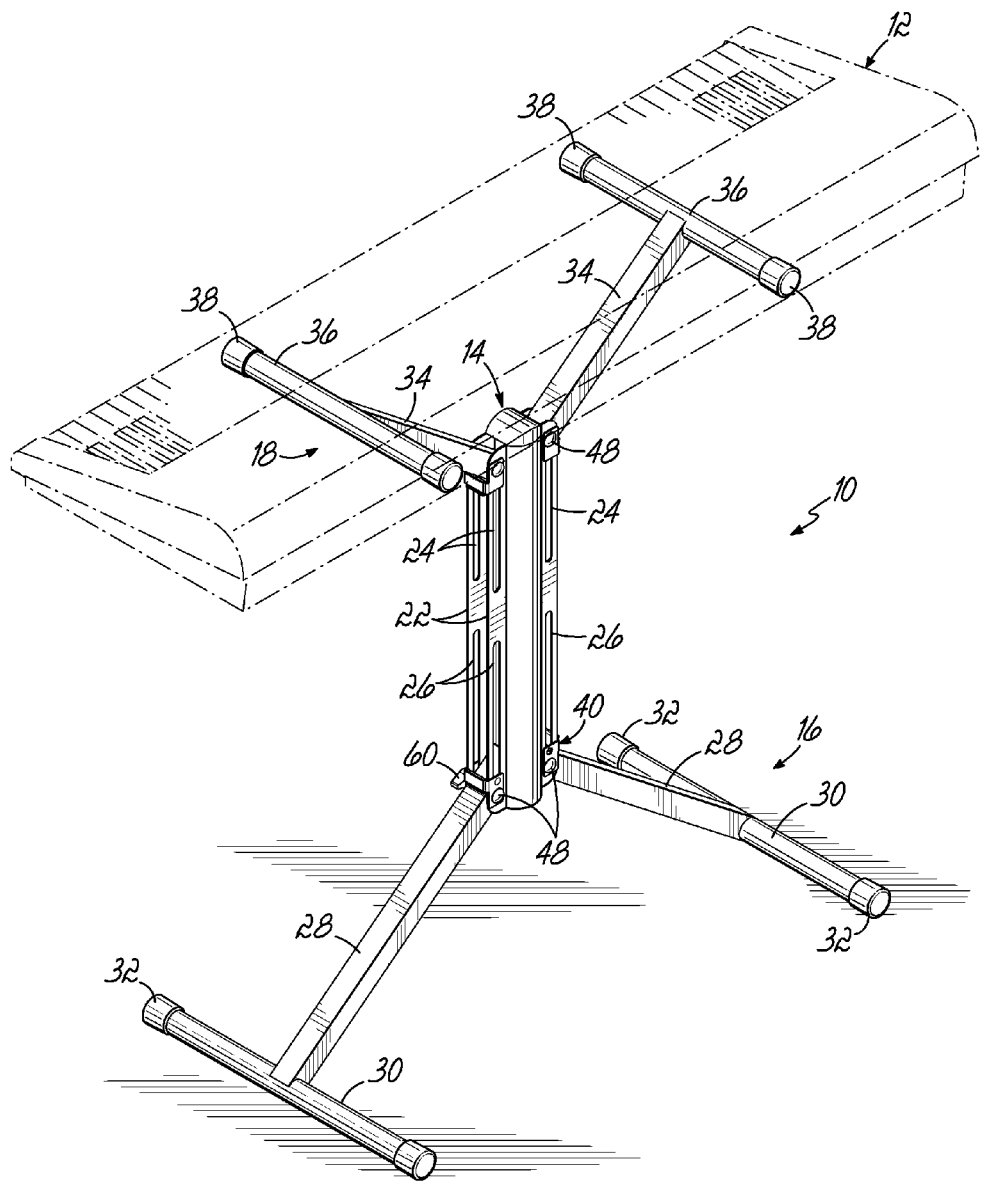
FIG. 1 is a front perspective view of one embodiment of a stand for supporting a musical electronic keyboard, shown in phantom, according to this invention.
Figure 2:
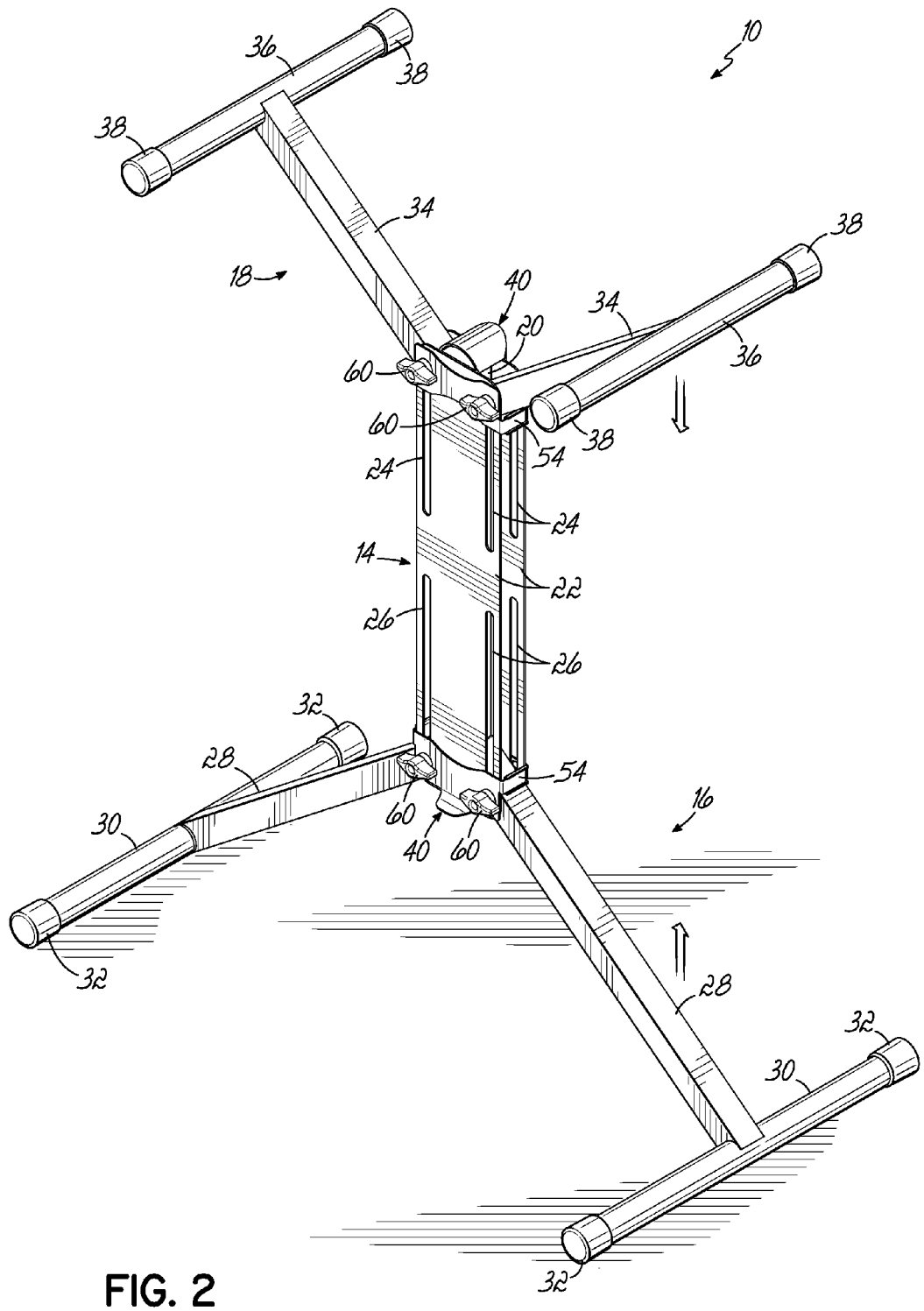
FIG. 2 rear perspective view of the stand of FIG. 1 being collapsed.
Figure 2A:
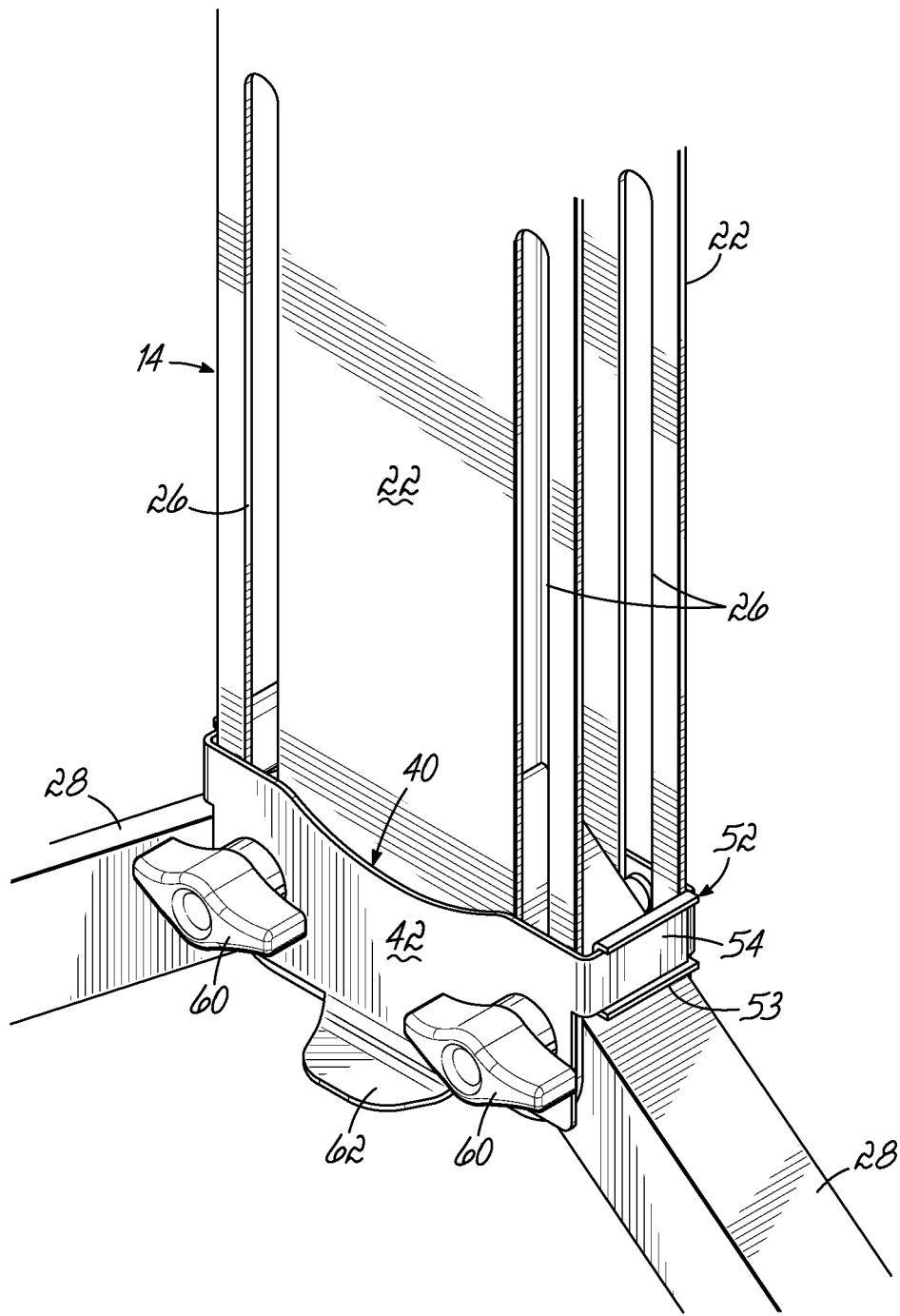
FIG. 2A is an enlarged view of a junction between a central column and the leg assembly of the stand of FIG. 2.
Figure 3:
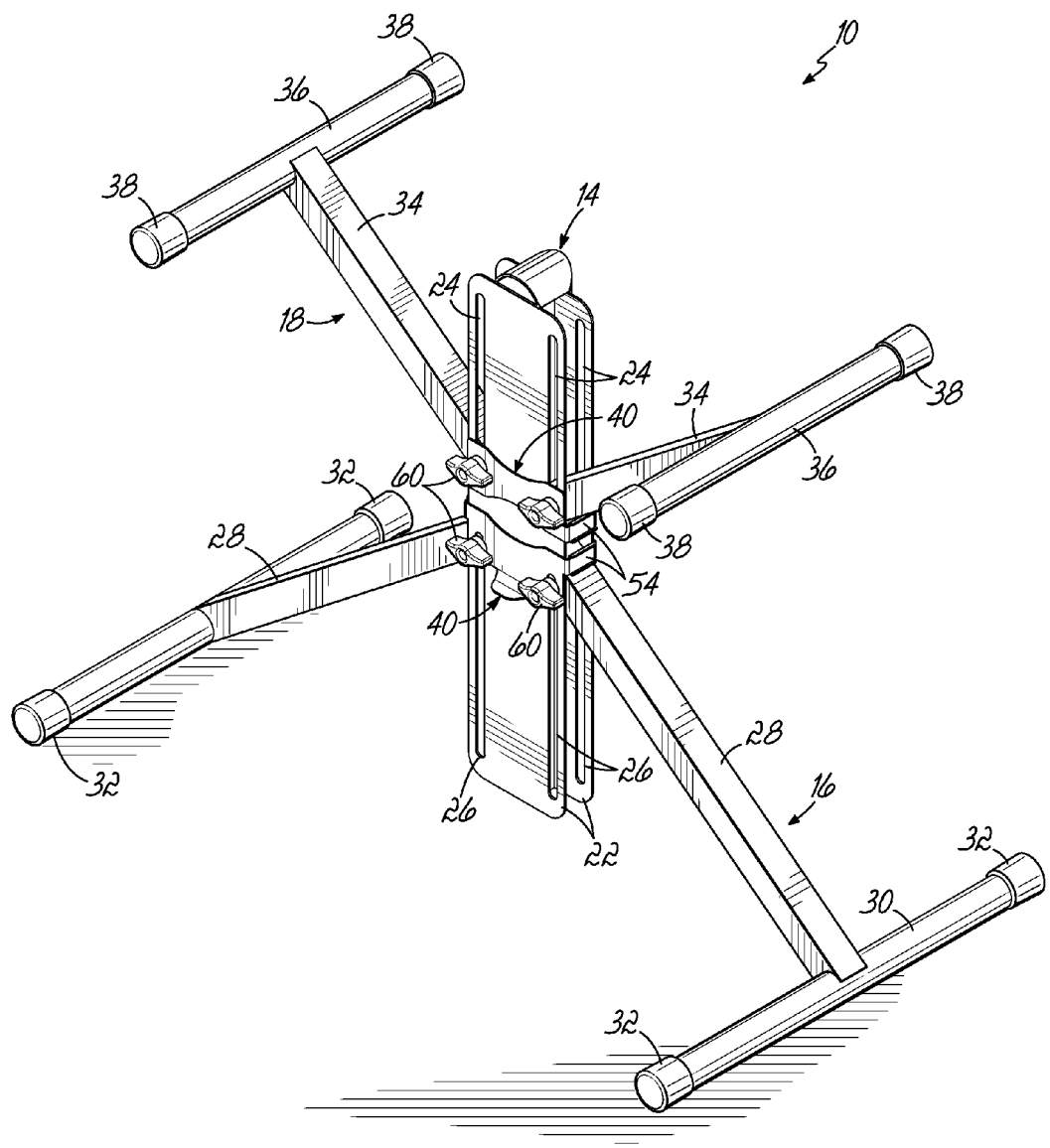
FIG. 3 is a view similar to FIG. 2 with the stand in a different configuration.

Referring to FIGS. 1-7C, one embodiment of a stand 10 adapted to support a musical electronic keyboard 12 according to this invention is shown. The invention herein is described for use with a keyboard 12, but any musical item or other work piece may be used on the stand 10. The stand 10 includes a central, generally vertically extending member or column 14. Coupled to a lower portion of the column 14 is a leg assembly 16 adapted to support the stand 10 on a floor surface or the like. An arm assembly 18 is coupled to the upper portion of the column 14. The column 14 includes a central post 20 which, in various embodiments, has two pairs of flanges 22 extending on opposite lateral sides of the post 20. Each flange 22 has an upper and a lower slot 24, 26 generally vertically oriented. The leg assembly 16 includes a pair of oppositely extending legs 28. A foot 30 extends perpendicularly to the longitudinal axis of each leg 28 at a distal end of each leg and may include a rubber footer 32 or grommet at each end of the foot 30. A proximal end of each leg 28 is captured between the flanges 22 of one of a pair of lateral extending flanges on the central column 14.

Similarly, the arm assembly 18 includes a pair of oppositely extending arms 34 with the proximal end of each arm positioned between each flange of one of the pairs of flanges. A supporting mount 36 extends generally perpendicularly to the longitudinal axis of each arm 34 and is mounted to the distal end of the arm. A rubber support 38 may be added to each end of the support arm.

Figure 8:
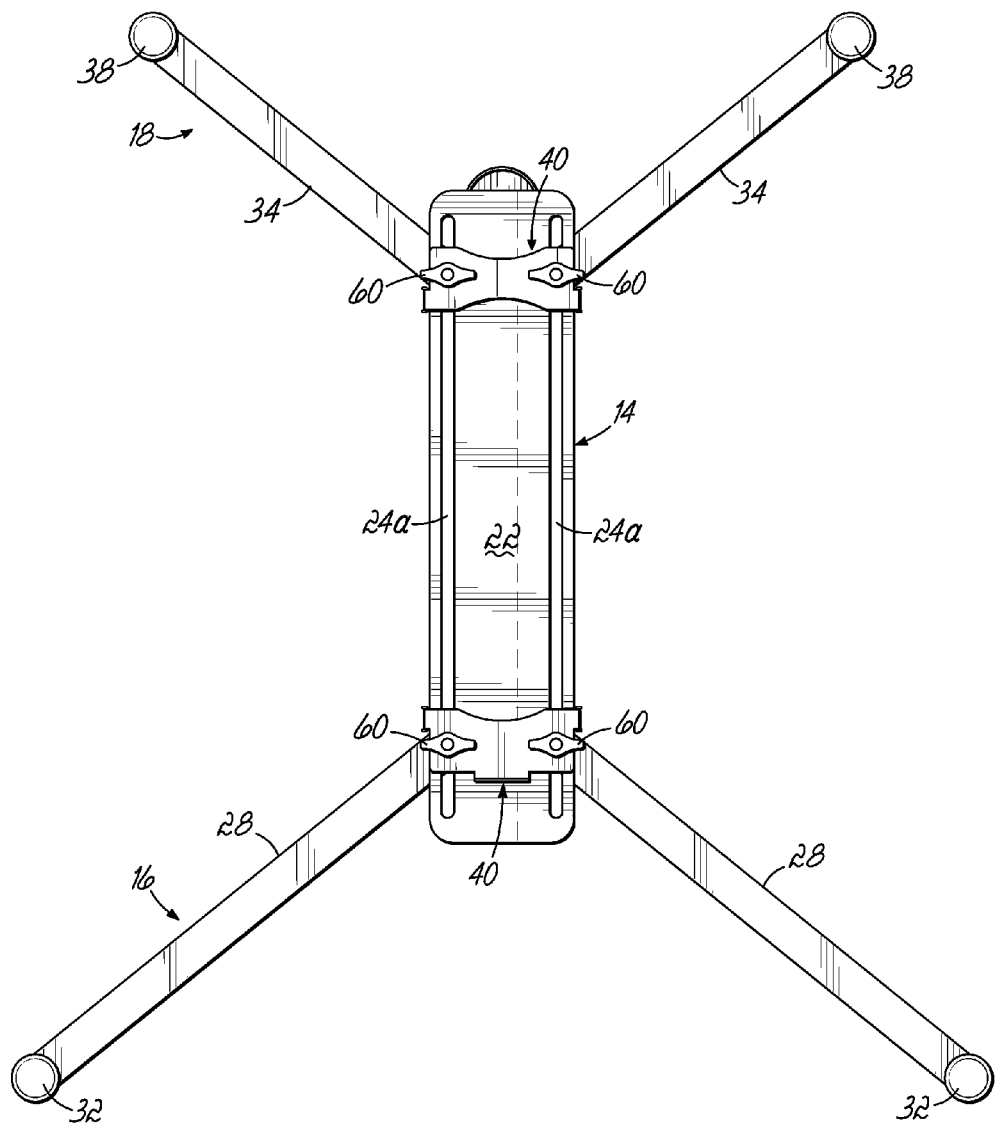
FIG. 8 is a front view of an alternative embodiment of the central column according to this invention.

While the multiple slots are shown and described herein, one of ordinary skill will appreciate that fewer or more slots could be utilized within the scope of this invention. For example, a single slot could be utilized for all of the arms and legs, a slot 24a on each side of the central column 22 as shown in FIG. 8 could be utilized to couple the arm and the leg on that side of the central column, a pair of slots on each side of the central column could be utilized with one of the arms or legs being pivotally coupled to each slot, or another arrangement and number of slots could be provided within the scope of this invention. Additionally, while slots are shown and described to pivotally couple the legs and arms to the central column and to guide their longitudinal movement relative to the central column, another arrangement could be utilized. For example, a square, rectangular or other shaped column with no flanges or slots in which the ends of the arms and the legs still bear against the column, transferring part of the force to the column, but the horizontal and vertical forces would be carried by the clamps alone, not by the flange(s). Moreover, a channel, a groove, a series of holes or pockets or another arrangement or member could be utilized within the scope of this invention and the term "slot" is intended to encompass all such arrangements to facilitate pivotal and/or longitudinal movement of the arm or leg relative to the central column.

Figure 4:
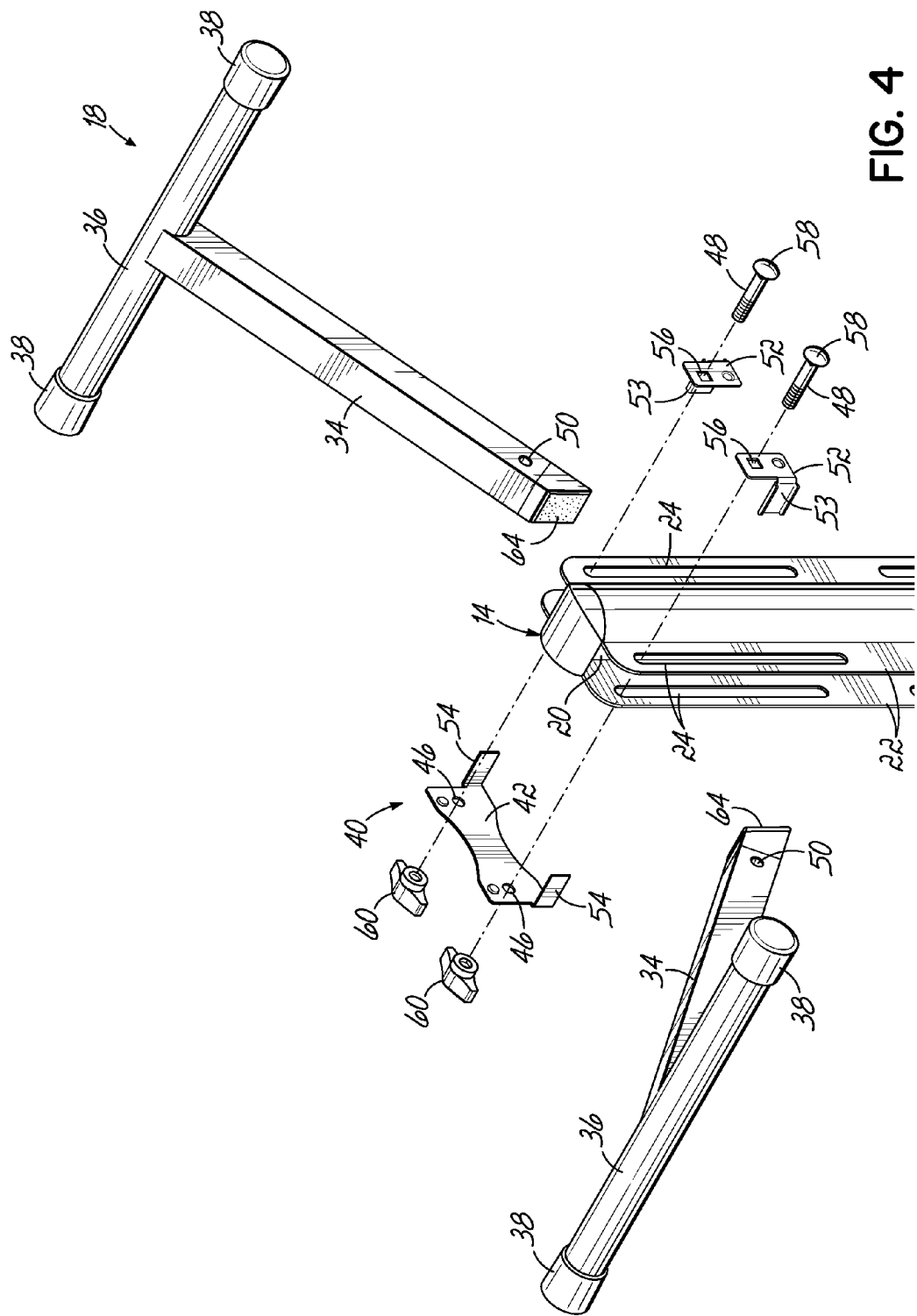
FIG. 4 is an exploded view of the junction between the central column and an arm assembly of the stand.
Figure 5:
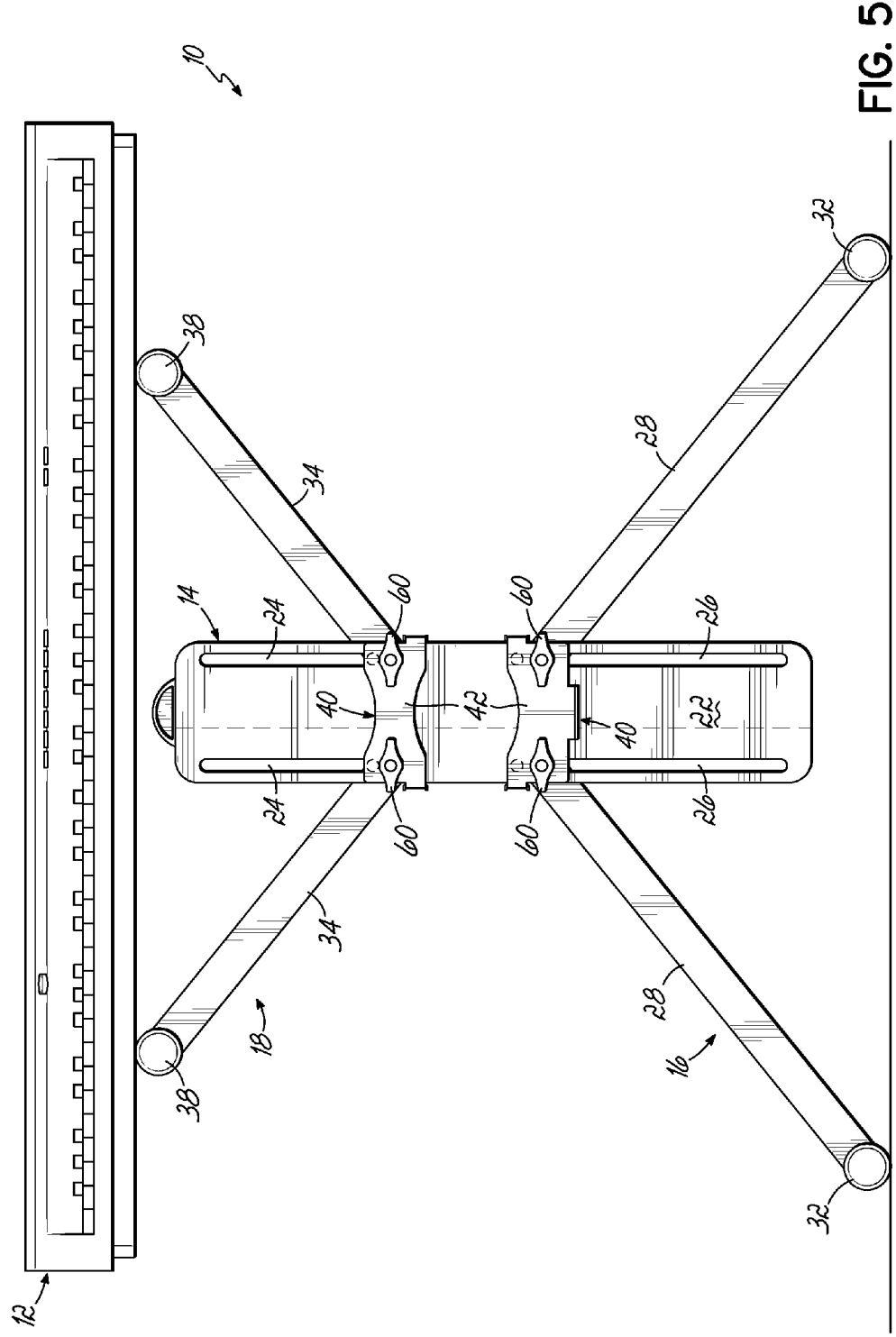
FIG. 5 is a rear elevational view of one embodiment of a stand supporting a musical electronic keyboard according to this invention.
Figure 6:
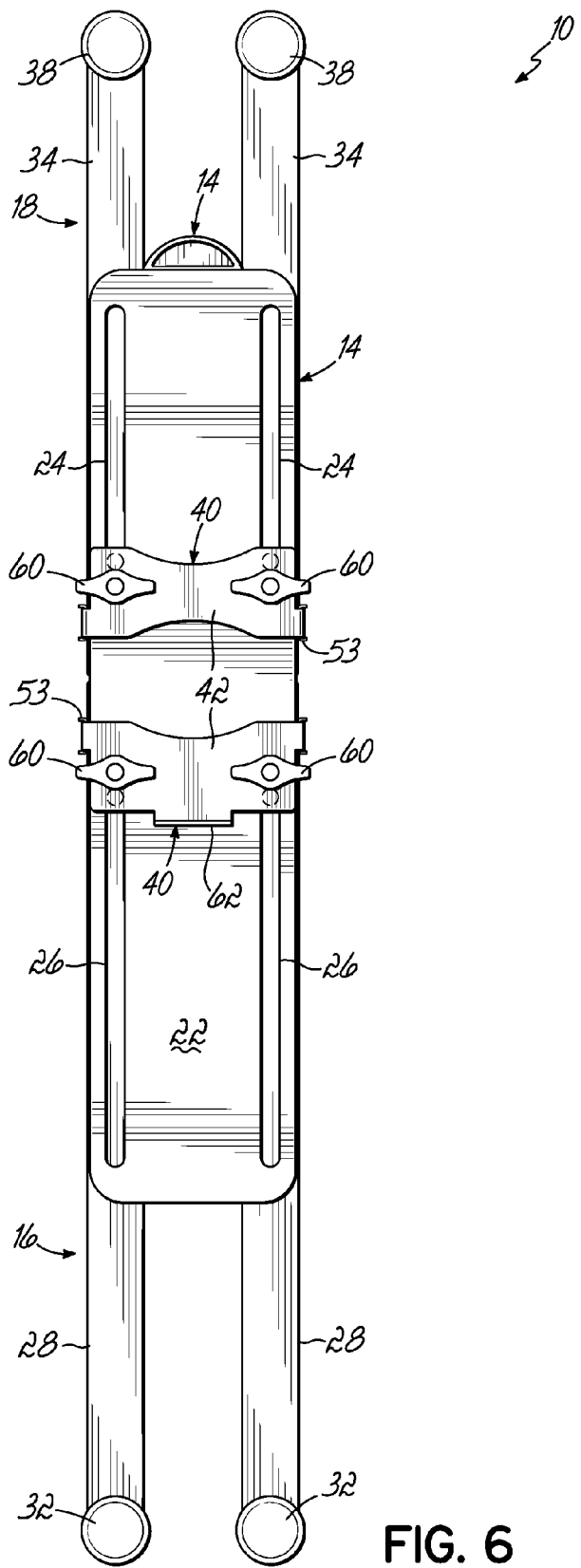
FIG. 6 is a rear elevational view of stand of FIG. 2 in a collapsed configuration.

As shown most clearly in FIG. 4, the leg assembly and arm assembly are each adjustably coupled to the central column 14 by a clamp assembly 40. Each clamp assembly 40 includes a saddle bracket 42 which is adapted to receive a guide pin assembly 44 to selectively secure the associated leg or arm of the stand 10 to the central column 14. The saddle bracket 42 includes a pair of holes 46, each of which is aligned with one of the slots 24, 26 in one of the pairs of laterally extending flanges 22. A guide pin or bolt 48 extends through a hole 50 in the associated arm 34 or leg 28 and pivotally couples the associated arm or leg to the central column 14 and extends through one of the holes 46 in the saddle bracket 42. A retainer 52 is also coupled to each end of the saddle bracket 42 on the front of the column 14 and cooperates with the guide pin assembly 44. Each retainer 52 includes an outwardly open channel 53 extending toward the bracket 42. Each guide pin assembly 44 includes the pin 48 which extends through a hole 56 in the retainer 52 and the hole 46 in saddle bracket 42 as well as the hole 50 adjacent the proximal end of the associated foot or arm. One end of the pin 48 includes a head 58 which secures the retainer 52 to the saddle bracket 42. The pin 48 is threaded and the distal end of the pin 48 receives a knob 60 for rotation on the pin 48. Rotation of the knob 60 in a first direction tightens the clamp assembly 40 to secure the associated foot or arm in a desired position relative to the central column 14; whereas, opposite rotation of the knob 60 loosens the clamp assembly 40 for adjustment of the associated foot or arm relative to the central column 14.

Figure 7A:
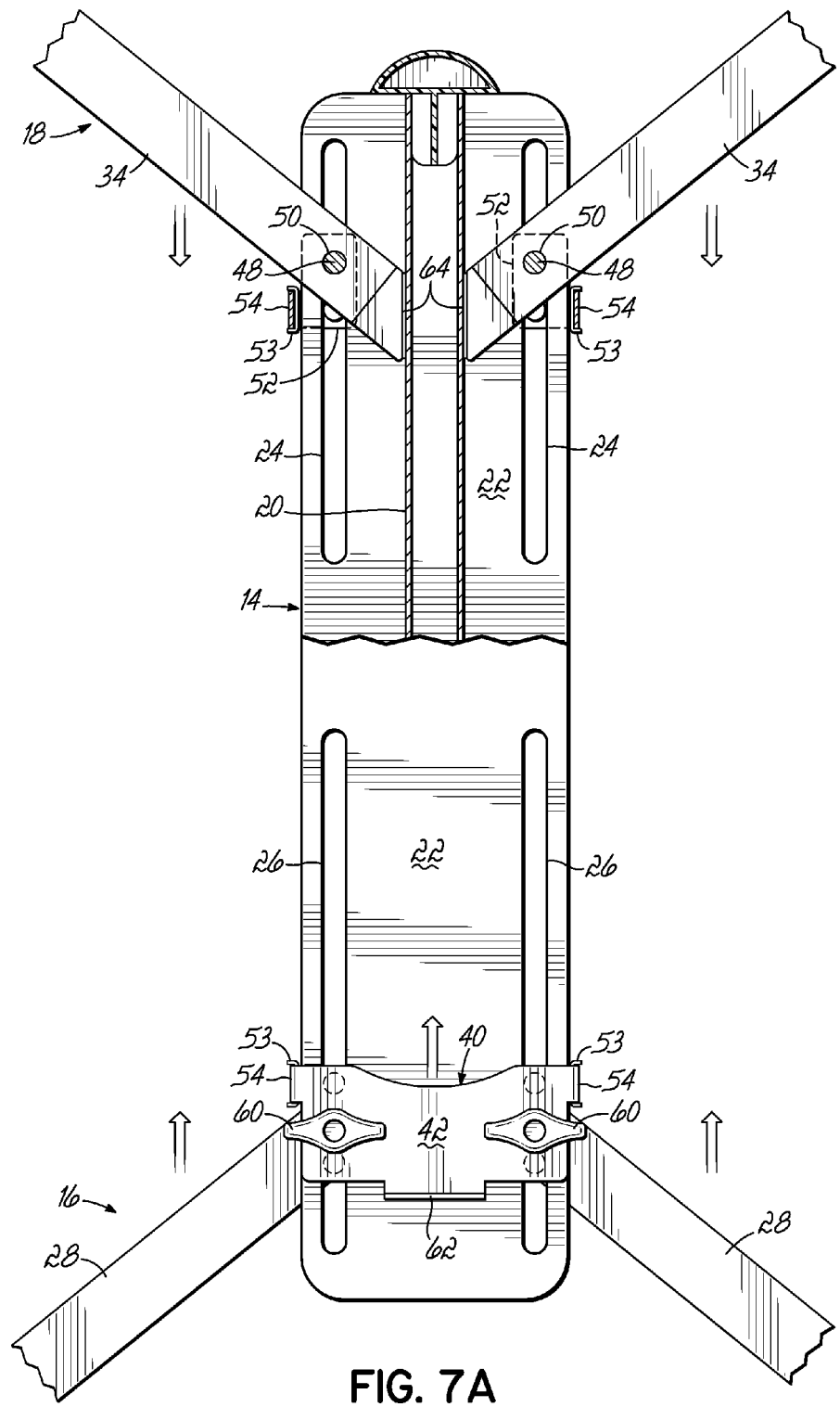
FIG. 7A is an enlarged rear elevational view of the central column of the stand of FIG. 2 with the leg and arm assemblies being collapsed with a portion of the central column being cut-away.
Figure 7B:
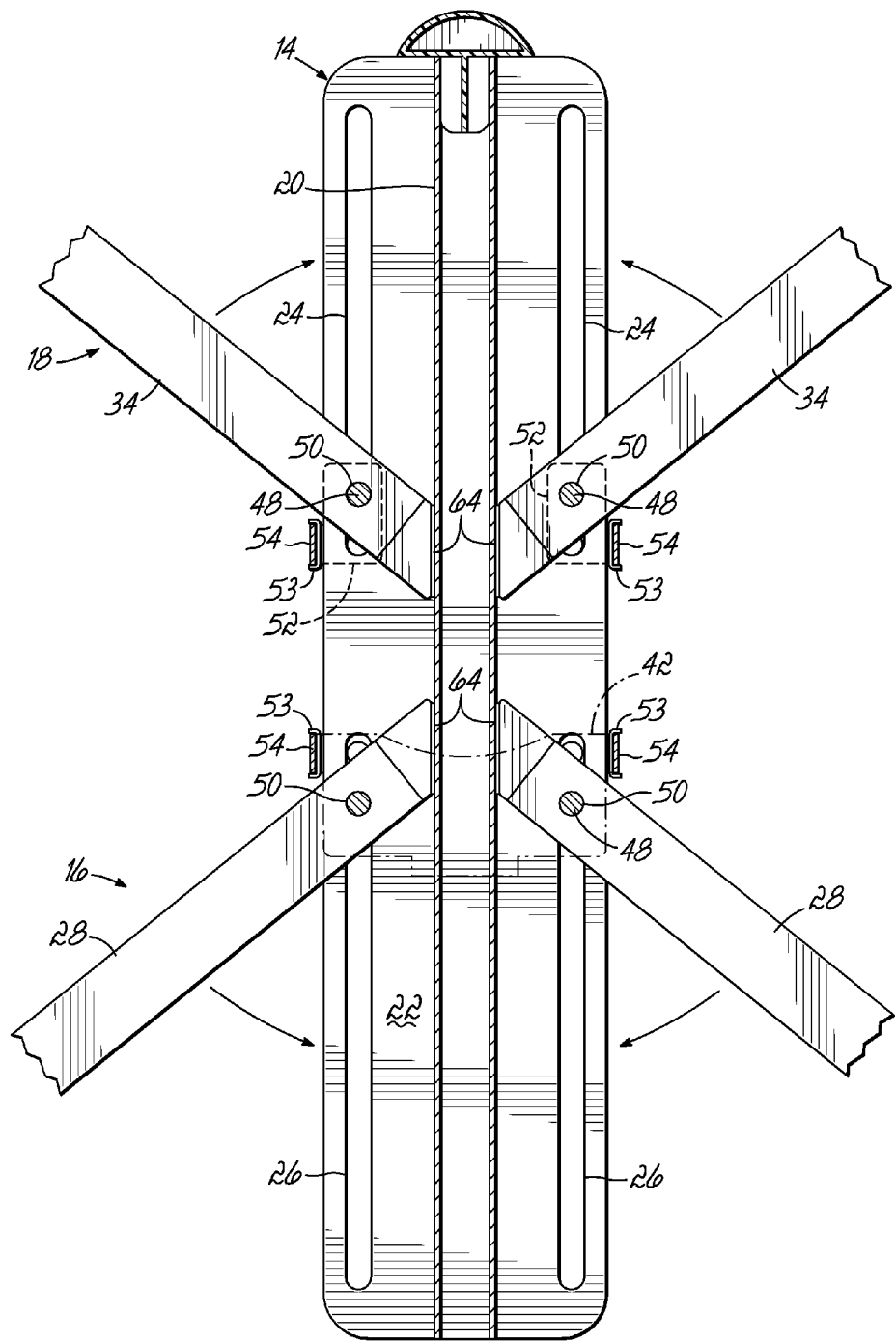
FIG. 7B is a view similar to FIG. 7A with the leg and arm assemblies being pivoted toward the central column.
Figure 7C:
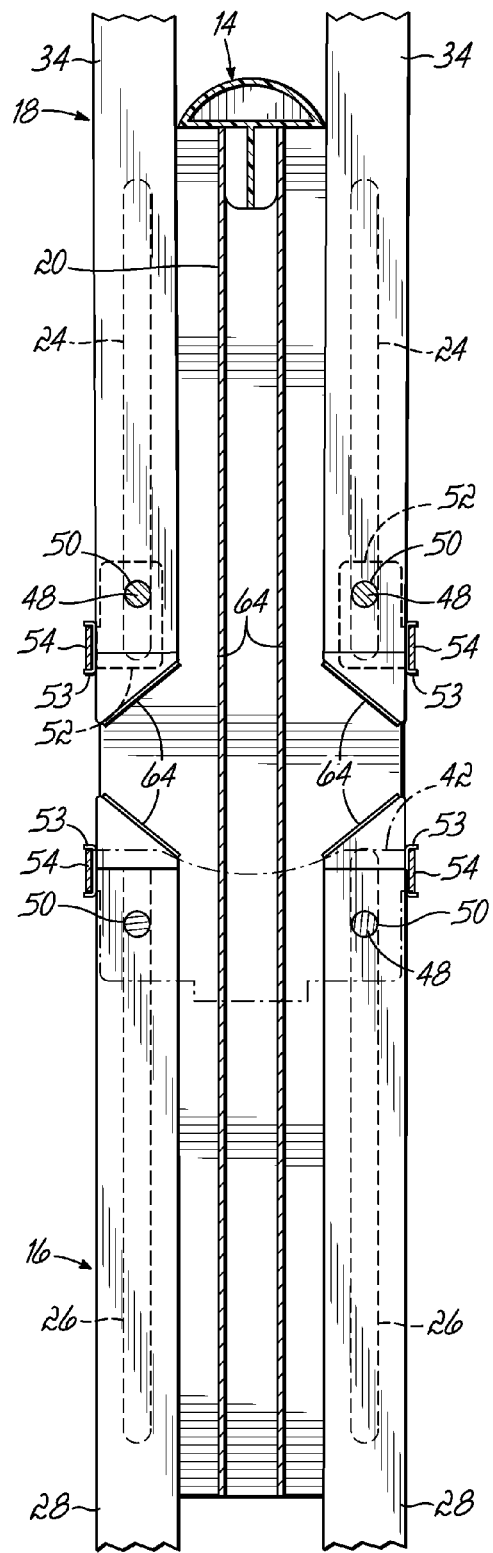
FIG. 7C is a view similar to FIG. 7B with the stand in a collapsed configuration.

Each saddle bracket 24 includes a pair of forwardly extending tabs 54 which are seated within one of the channels 53 of the associated retainer 52 (see FIGS. 7A-7C). The saddle bracket 42 for the leg assembly 16 may include a lip or hand grip 62 (FIGS. 5 and 7C) for a user to reposition the saddle bracket 42 and associated clamp assembly 40 relative to the central column 14 as will be described herein below.

According to various embodiments of the stand 10 of this invention, the vertical positions of the leg assembly 16 and of the arm assembly 18 may be independently adjusted by a user relative to the central column 14 (FIG. 7A). Moreover, an angular position of each leg 28 and of each arm 34 relative to the central column 14 may be independently adjusted relative to the remaining arms or legs (FIG. 7B). With the knobs 60 rotated to an adjustment or loosened position, the angular orientation of the associated leg 28 or arm 34 may be adjusted relative to the central column 14. Likewise, when both the knobs 60 on the clamp assembly for the leg or arm assembly 16, 18 are loosened, the entire assembly 16, 18 may be slidably adjusted within the slots 24, 26 relative to the central column 14. The hand grip 62 on the saddle bracket 42 of the leg assembly 16 may assist a user in positioning the saddle bracket 42 and associated leg assembly 16 relative to the central column 14 when the associated knobs 60 are loosened. The proximal end of each leg 28 and of each arm 34 may include a rubber face or grommet 64 for frictional engagement with the post 20 of the central column 14 to minimize any noise which may be generated by movement of the adjacent components of the stand 10 and increase frictional interaction with the post 20.

The entire height of the stand 10 may be adjusted in a variety of manners. For example, the angular position of the legs 28 may be adjusted to adjust the overall height of the stand 10; the angular position of the arms 34 may be adjusted to adjust the overall height of the stand 10; the leg assembly 16 may be vertically adjusted relative to the central column 14 to adjust the overall height of the stand 10 and/or the arm assembly 18 may be vertically adjusted relative to the central column 14 to adjust the overall height of the stand 10. Unlike past keyboard and DJ Coffin stands, the spatial separation of the arms 34 relative to one another may be adjusted, but is not required to be adjusted, when the height of the stand is adjusted to a desired position and to accommodate different heights and styles of players. Similarly, the spatial separation of the legs 28 may be adjusted, but is not required to be adjusted, when adjusting the overall height of the stand 10. Under most operating conditions, the arms 34 and legs 28 are pivoted outwardly to fully seat the associated face 64 against the post 20 for a stable and secure support (see FIG. 7B). In this angular orientation of the arms 34 and of the legs 28, the overall height of the stand 10 may be adjusted without changing the arms 34 or legs 28 angular orientation.

To convert the stand 10 according to various embodiments of this invention to a collapsed configuration for storage and/or transport, one or more of the knobs 60 may be loosened to collapse the associated leg 28 or arm 34 toward the central column 14 so that it is seated between the pair of the flanges 22 to which it is connected (see FIGS. 7B-7C). The longitudinal axis of each leg 28 or arm 34 may be generally parallel with the central column 14 in the collapsed configuration (see FIGS. 6 and 7C).

An additional advantage of various embodiments of the stand 10 according to this invention is that the vertical position of the clamp assembly 40 and/or the associated arm assembly 18 or leg assembly 16 does not need to be adjusted relative to the central column 14 to convert the stand 10 into a collapsed configuration; however, movement of the clamp assembly 40 vertically toward one another may provide for the most compact configuration of the stand 10, if desired.

Figure 9:
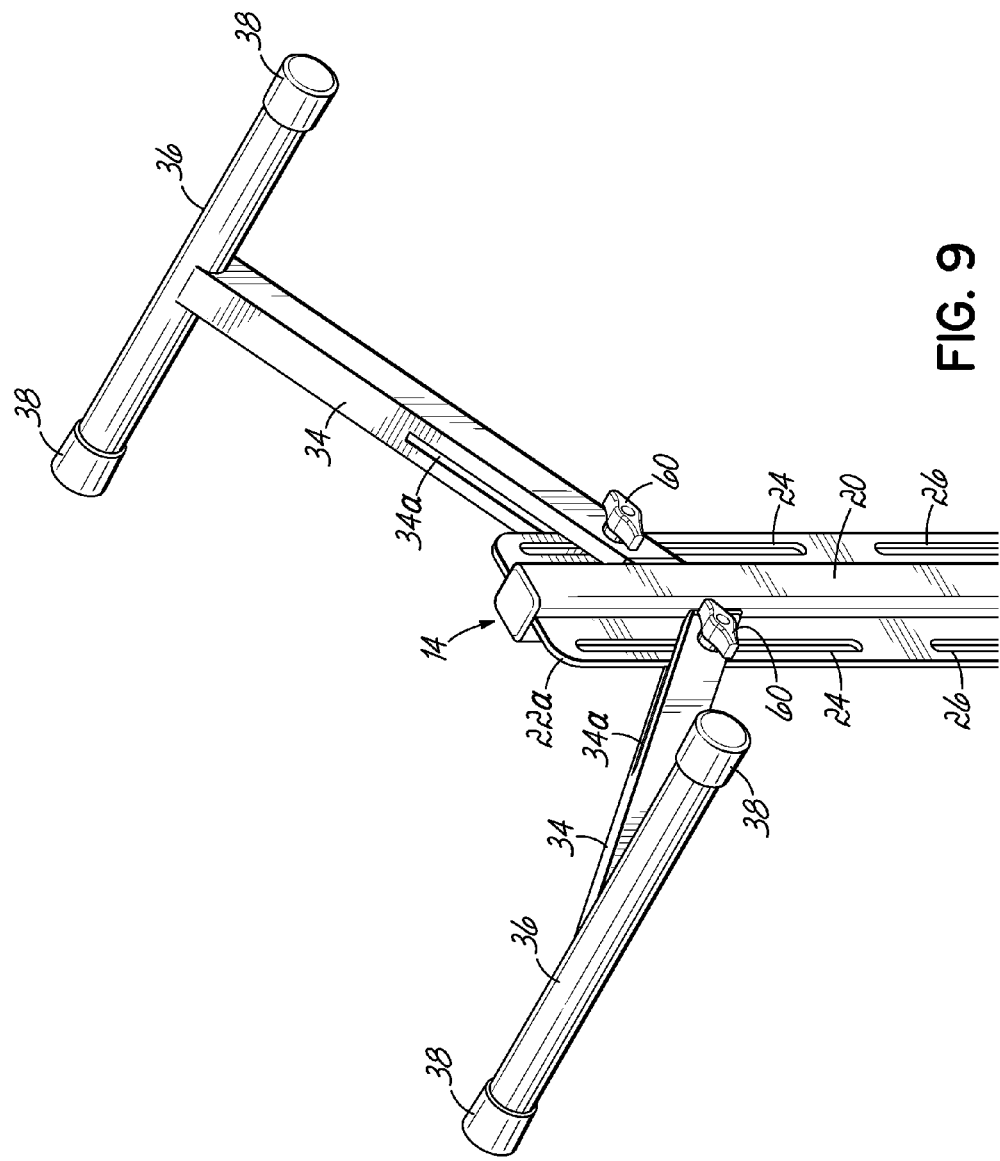
FIG. 9 is a perspective view of a further alternative embodiment of the stand according to this invention.

One alternative embodiment of this invention is shown in FIG. 9 in which a single flange 22a extends laterally from each side of the central column 14. Each flange 22a may have upper and lower slots 24, 26 as shown in FIG. 9 or may have a single slot similar to the embodiment in FIG. 8 or another arrangement. The respective arms 34 and legs 28 are each adjustably coupled to the associated flange 22a via a clamp assembly including a knob 60 threadably mounted on a bolt or similar fastener for tightening and loosening engagement with the flange 22a. A slot 34a may be provided in each arm 34 and a similar slot (not shown) may be provided in each leg 28 in which the flange 22a is positioned. The length of the respective slot 34a may allow for at least partial or full collapse of the arms 34 and legs 28 relative to the central column 14, similar to the arrangement shown in FIG. 7C for an alternative embodiment.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

I claim:

1. An adjustable stand comprising:
   a central member;
   a pair of legs comprising a first leg and a second leg each extending from and coupled to the central member by a leg clamp assembly, the pair of legs to support the stand on an underlying surface;
   a pair of arms comprising a first arm and a second arm each extending from and coupled to the central member by an arm clamp assembly;
   the leg clamp assembly pivotally coupling the legs to the central member, the leg clamp assembly in a sliding engagement with the central member to allow for translation of each associated leg relative to the central member in a direction generally parallel with a longitudinal axis of the central member to adjust a height of the stand; and,
   the arm clamp assembly pivotally coupling the arms to the central member, the arm clamp assembly in a sliding engagement with the central member to allow for translation of each associated arm relative to the central member in a direction generally parallel with the longitudinal axis of the central member to adjust the height of the stand; and,
   a pair of mounts comprising a first mount and a second mount, each mount being mounted on a distal end of one of the arms to support a work piece upon the stand, and wherein the arm clamp assembly is engaged to the central member above the leg clamp assembly.

2. The adjustable stand of claim 1 further comprising: a pair of feet comprising a first foot and a second foot, each foot being mounted on a distal end of one of the legs to support the stand on the underlying surface.

3. The adjustable stand of claim 1 wherein the first leg includes an angular position relative to the central member, the second leg includes an angular position relative to the central member, and the angular position of each of the first leg and the second leg relative to the central member is independently adjustable relative to the angular position of the second leg and the first leg, respectively.

4. The adjustable stand of claim 1 wherein the pair of legs includes a longitudinal position relative to the central member, the pair of arms includes a longitudinal position relative to the central member, and the longitudinal position of the pair of legs and the pair of arms relative to the central member is independently adjustable relative to the longitudinal position of the pair of arms and the pair of legs, respectively.

5. The adjustable stand of claim 1 wherein each leg and each arm is adjustable over a range of angular orientations relative to the central member including a collapsed configuration in which each of the legs and each of the arms is juxtaposed adjacent to the central member with the longitudinal axis of the central member being generally parallel to each leg and each arm.

6. The adjustable stand of claim 1 wherein each leg includes a proximal end and each arm includes a proximal end, wherein each leg pivots outward to seat the proximal end of each leg against the central member, and wherein each arm pivots outward to seat the proximal end of each arm against the central member.

7. The adjustable stand of claim 1 further comprising: at least one slot associated with the central member to which at least one arm or leg is pivotally coupled and a longitudinal movement of the arm or leg is guided by the at least one slot.

8. The adjustable stand of claim 1 further comprising: at least two slots each associated with the central member, the first arm and the first leg each being pivotally coupled to a first slot of the at least two slots and the second arm and the second leg each being pivotally coupled to a second slot of the at least two slots; wherein longitudinal movement of each leg and of each arm relative to the central member is guided by the first slot or the second slot.

9. The adjustable stand of claim 1 further comprising: four pair of slots associated with the central member, each pair of slots having a proximal end of one of the legs or one of the arms pivotally coupled thereto; wherein longitudinal movement of each leg and of each arm relative to the central member is guided by the pair of slots.

10. The adjustable stand of claim 1 wherein the leg clamp assembly allows for angular adjustment of the pair of legs relative to the central member and to allow for translation of the pair of legs relative to the central member in the direction generally parallel with the longitudinal axis of the central member, and the arm clamp assembly allows for angular adjustment of the pair of legs relative to the central member and to allow for translation of the pair of legs relative to the central member in the direction generally parallel with the longitudinal axis of the central member.

11. The adjustable stand of claim 1 wherein an overall height of the stand is adjustable without changing a distance between the distal end of the first arm relative to the distal end of the second arm.

12. A combination comprising the adjustable stand of claim 1 and:
   at least one of an electronic keyboard and a DJ coffin;
   the adjustable stand to support the at least one of the electronic keyboard and the DJ Coffin.

13. An adjustable stand comprising:
   a central member;
   a pair of legs comprising a first leg and a second leg each extending from and coupled to the central member by a leg clamp assembly, the pair of legs to support the stand on an underlying surface;
   a pair of arms comprising a first arm and a second arm each extending from and coupled to the central member by an arm clamp assembly;
   the leg clamp assembly pivotally coupling the legs to the central member, the leg clamp assembly in a sliding engagement with the central member to allow for translation of each associated leg relative to the central member in a direction generally parallel with a longitudinal axis of the central member to adjust a height of the stand;
   the arm clamp assembly pivotally coupling the arms to the central member, the arm clamp assembly in a sliding engagement with the central member to allow for translation of each associated arm relative to the central member in a direction generally parallel with the longitudinal axis of the central member to adjust the height of the stand; and
   wherein the first arm includes an angular position relative to the central member, the second arm includes an angular position relative to the central member, and the angular position of each of the first arm and the second arm relative to the central member is independently adjustable relative to the angular position of the second arm and the first arm, respectively.

14. A combination comprising the adjustable stand of claim 13 and:
   at least one of an electronic keyboard and a DJ coffin;
   the adjustable stand to support the at least one of the electronic keyboard and the DJ Coffin.

15. An adjustable stand comprising:
   a central member;
   a pair of legs comprising a first leg and a second leg each extending from and coupled to the central member by a leg clamp assembly, the pair of legs to support the stand on an underlying surface;
   a pair of arms comprising a first arm and a second arm each extending from and coupled to the central member by an arm clamp assembly;
   the leg clamp assembly pivotally coupling the legs to the central member, the leg clamp assembly in a sliding engagement with the central member to allow for translation of each associated leg relative to the central member in a direction generally parallel with a longitudinal axis of the central member to adjust a height of the stand;
   the arm clamp assembly pivotally coupling the arms to the central member, the arm clamp assembly in a sliding engagement with the central member to allow for translation of each associated arm relative to the central member in a direction generally parallel with the longitudinal axis of the central member to adjust the height of the stand; and
   at least one arm slot associated with the central member to which each of the first and the second arms is pivotally coupled; and at least one leg slot associated with the central member to which each of the first and the second legs is pivotally coupled; wherein longitudinal movement of each leg and of each arm relative to the central member is guided by the at least one leg slot and the at least one arm slot, respectively.

16. A combination comprising the adjustable stand of claim 15 and:
   at least one of an electronic keyboard and a DJ coffin;
   the adjustable stand to support the at least one of the electronic keyboard and the DJ Coffin.

17. An adjustable stand comprising:
   a central member;
   a pair of legs comprising a first leg and a second leg each extending from and coupled to the central member;
   a pair of arms comprising a first arm and a second arm each extending from and coupled to the central member;
   and at least one clamp assembly pivotally coupling the arms and the legs to the central member and to allow for translation of each leg or arm relative to the central member in a direction generally parallel with a longitudinal axis of the central member;
   four pair of slots associated with the central member, each pair of slots having a proximal end of one of the legs or one of the arms pivotally coupled thereto; wherein a longitudinal movement of each leg and of each arm relative to the central member is guided by the pair of slots pivotally coupling each leg or each arm to the central member;
   two pairs of flanges each projecting laterally outwardly from the central member, each flange of each pair of flanges being spaced and oriented generally parallel with the other flange of the pair of flanges, each flange having an upper and a lower slot, the lower slots of each pair of flanges being associated with one of the legs and the upper slots of each pair of flanges being associated with one of the arms.

18. A combination comprising the adjustable stand of claim 17 and:
   at least one of an electronic keyboard and a DJ coffin;
   the adjustable stand to support the at least one of the electronic keyboard and the DJ Coffin.

19. An adjustable stand for supporting an electronic keyboard or DJ coffin comprising:
   a central column;
   a pair of legs comprising a first leg and a second leg each extending from and coupled to the central column, the pair of legs to support the stand on an underlying surface;
   a pair of arms comprising a first arm and a second arm each extending from and coupled to the central column to support an electronic keyboard or DJ coffin;
   at least one clamp assembly pivotally coupling the arms and the legs to the central column and to allow for translation of the arms or the legs relative to the central column in a direction generally parallel with a longitudinal axis of the central column;
   wherein each of the first leg, the second leg, the first arm, and the second arm include a proximal end, and the first leg, the second leg, the first arm, and the second arm pivot outward to seat the proximal ends of the first leg, the second leg, the first arm, and the second arm against the central column;
   wherein an overall height of the stand is adjustable without changing a distance between a distal end of the first arm relative to a distal end of the second arm;
   wherein a longitudinal position of the pair of legs and the pair of arms relative to the central column is independently adjustable relative to the longitudinal position of the pair of arms and the pair of legs; and,
   a pair of clamp assemblies comprising a first clamp assembly and a second clamp assembly, each pair of clamp assemblies coupling one of the pair of arms and the pair of legs to the central column to allow for angular adjustment of each associated leg and arm relative to the central column and to allow for translation of each associated leg and arm relative to the central column in the direction generally parallel with the longitudinal axis of the central column.

20. The adjustable stand of claim 19 wherein each leg and each arm is adjustable over a range of angular orientations relative to the central column including a collapsed configuration in which each of the legs and each of the arms is juxtaposed adjacent to the central column with the longitudinal axis of the central column being generally parallel to each leg and each arm.

21. The adjustable stand of claim 20 further comprising: four pairs of slots associated with the central column, each pair of slots having a proximal end of one of the legs or one of the arms pivotally coupled thereto; wherein longitudinal movement of each leg and of each arm relative to the central column is guided by the associated pair of slots.

* * * * *